Oct. 20, 1959  A. J. SIMMONS ET AL  2,909,282
APPARATUS FOR SORTING BALLS FROM CLUSTERS
Filed Dec. 13, 1954
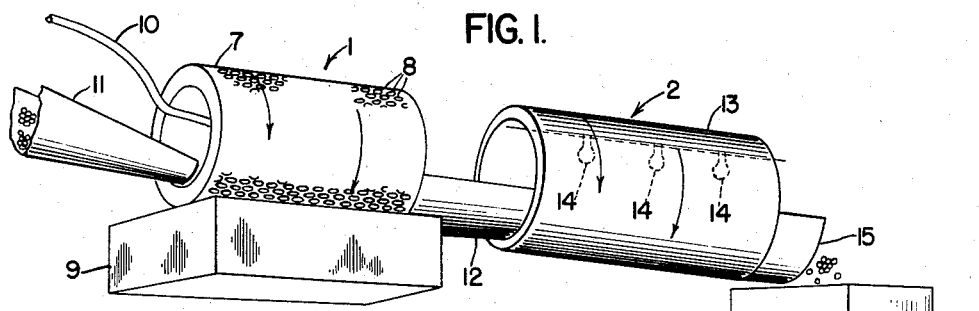
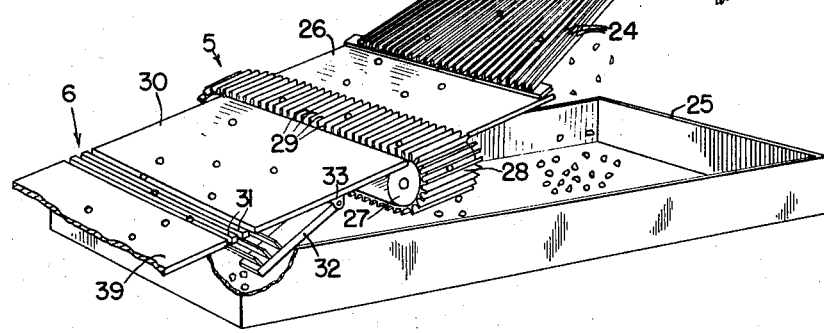
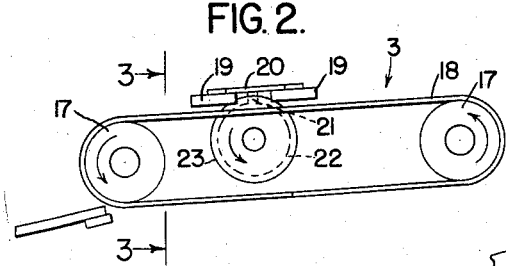
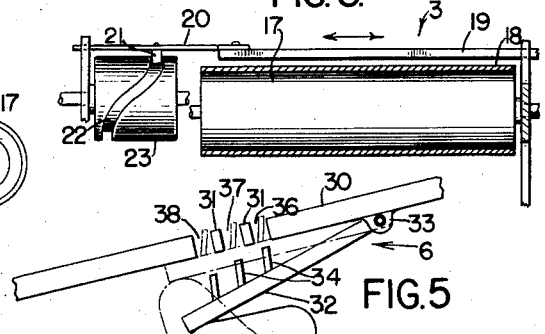
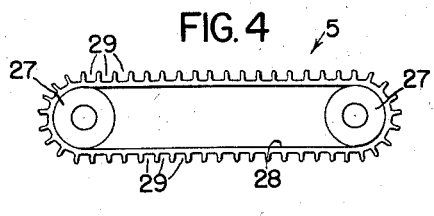
INVENTORS
ALDRED J. SIMMONS
ALLEN O. SOHN
BY *Andrus & Sceales*
Attorneys

United States Patent Office 2,909,282
Patented Oct. 20, 1959

2,909,282

APPARATUS FOR SORTING BALLS FROM CLUSTERS

Aldred J. Simmons, Sheboygan, and Allen O. Sohn, Plymouth, Wis., assignors to Plymouth Industrial Products, Inc., Plymouth, Wis., a corporation of Wisconsin Application December 13, 1954, Serial No. 474,896

5 Claims. (Cl. 209—75)

This invention relates to a process and apparatus for sorting balls, and more particularly to a process and apparatus for separating and selecting small molded plastic balls which are used in cleaning out boilers and the like.

In the manufacture of relatively small diameter plastic balls to be used in blasting rust and other impurities from the inner walls of large boilers, many problems have arisen due to the fact that the balls are molded in the form of mats, each mat consisting of a number of ball clusters which are connected together by gates or the like. Before the balls can be used in boiler cleaning, the mats must be broken into individual balls. The uniform spherical balls must then be separated from those which are out-of-round or otherwise unsuitable.

Heretofore, no effective means has been found to both separate and sort the balls in a single series of related steps without the use of two or more entirely independent machines. Previously, the balls which had been separated from the clusters by one machine were then transported to the sorting machine for further processing. In view of the fact that millions of plastic balls may be required to clean a single boiler, efficiency of production is essential to meet the production demand. Former mechanisms were incapable of meeting the high efficiency requirement.

The present invention contemplates the use of a novel process and mechanism for performing the process which both breaks up the ball mats and clusters and separates the spherical pieces from those which are imperfect, all in one series of related steps. The balls pass through the machine in a continuous stream with no human attention necessary during the operation.

The accompanying drawing illustrates the best mode presently contemplated by the inventors for carrying out the invention.

In the drawing:

Figure 1 is a schematic perspective view of a mechanism for treating the boiler balls;

Fig. 2 is an end elevation of the cluster breaker, shown in Figure 1;

Fig. 3 is a section of the cluster breaker taken on line 3—3 of Fig. 2;

Fig. 4 is a side elevation of the slotted conveyor shown in Figure 1;

Fig. 5 is an enlarged side elevation of the ball sorter shown in Figure 1; and

Fig. 6 is a top plan view of a portion of a typical ball mat which the machine processes.

As shown in the drawing, the major portions of the apparatus comprise a tumbler 1, a drier 2, a ball cluster breaker 3, a chaff remover 4, a slotted conveyor 5 and a parallel bar ball sorter 6. The machine is adapted to receive ball mats and clusters, shown in Fig. 6, and discharge only perfectly spherical balls.

Tumbler 1 comprises a substantially cylindrical drum 7 which contains a number of perforations 8 on its outer circumference. Perforations 8 are smaller than the desired ball diameter so that only small or broken balls and other extraneous matter will fall out of the drum and into a waste receptacle 9 as drum 7 is rotated.

At least a portion of the integrally attached balls will be broken up into separate balls by tumbler 1.

In addition to the tumbling action, tumbler 1 may be equipped with a device to wash the stream of balls. The water may be supplied through a conduit 10, or by any other suitable means. After cleaning the balls, the water will flow out through perforations 8 and into waste receptacle 9 where it may be disposed of.

Drum 7 is disposed on an incline or may be slightly conical so that the inlet is somewhat higher than the outlet.

A chute 11 or other conveying means is disposed at the inlet to drum 7 and serves to convey the ball mats and clusters to the drum from a storage area or the like. A similar chute 12 is disposed at the outlet of drum 7 and carries the washed and partially separated balls to the drier 2.

The drying operation may be accomplished by a number of means, that shown in the drawing being an inclined substantially cylindrical drum 13 equipped inside with a bank of infrared heating units 14. As drum 13 rotates, the mechanical action breaks up more of the ball clusters and exposes all of the ball surfaces to the heating action. Centrifuging, blotting or an air blast may be substituted for the infrared units without departing from the spirit of the invention.

At the outlet portion of drum 13 is disposed a third chute 15 and a hopper 16 which transfer the stream of dried balls and clusters to the cluster breaker 3, which serves to break up any remaining ball clusters and remove any extraneous matter on the outside surface of the balls, such as gate protrusions formed during the molding operation.

Cluster breaker 3 comprises a pair of spaced parallel cylinders 17 which rotate and serve to drive an endless conveyor belt 18 which is disposed thereover. Belt 18 is of a material which presents a high friction face to the balls. A pair of movable plates 19 is disposed over the top surface of belt 18 over which the balls and clusters travel. Plates 19 are reciprocated in a direction transverse to the movement of belt 18 and are spaced thereabove so that the upper surfaces of balls and clusters traveling along the belt will come in contact with the lower surfaces of plates 19. These lower surfaces provide a non-abrasive, non-skid bearing surface. The high friction face of belt 18 and the transverse reciprocating motion of plates 19 create a shearing action which immediately separates any remaining clusters and breaks off protrusions on individual balls.

Plates 19 are secured by any suitable means to a T-shaped member 20 which is in turn secured to a cam follower 21 which rides in a cam groove 22. Cam groove 22 is disposed on the surface of a cylindrical member 23 and is contoured so that rotation of member 23 causes plates 19 to have reciprocating motion. The downward pressure which plates 19 exert on the balls may be controlled by adjustable load springs, not shown.

After the clusters have been broken, the balls continue down belt 18 and fall into the chaff remover 4, which comprises a series of inclined slats 24 which are spaced so that balls of the requisite diameter will be supported by two of the slats as they roll down the incline. Any chaff, broken balls, or other undersized matter received from cluster breaker 3 will fall between the slats 24 into a suitable waste receptacle 25.

The balls, after reaching the bottom of the inclined slats 24, pass to an inclined plate 26 and hence to the slotted conveyor 5.

Slotted conveyor 5 comprises a pair of spaced parallel cylindrical members 27 disposed to rotate in a direction transverse to the movement of the balls. Disposed over members 27 is an endless belt 28 which has grooves 29 throughout its outer surface which are disposed in a direction parallel to the ball flow and inclined at the same angle as plate 26.

Balls traveling down plate 26 enter the various grooves 29. Those balls which are reasonably round will continue to roll, due to inertia and gravity, and will pass through the grooves 29 and hence down inclined plate 30 to the parallel-bar ball sorter 6. Those balls which are non-spherical will stop rolling in grooves 29. Since belt 28 is traveling transversely to the direction of ball movement, the non-spherical balls will be conveyed to the end of conveyor 5 and will fall into receptacle 25 and be disposed of.

The last portion of the apparatus is the ball sorter 6 which comprises a plurality of parallel bars 31 disposed transversely to the direction of ball movement. The bars 31 are spaced apart a distance slightly less than the diameter of the balls desired and each bar provides a pair of continuous parallel bearing edges so that a plurality of perfectly spherical balls may rest between any pair of edges simultaneously while imperfect material will fall between them into receptacle 25.

A number of transversely spaced reciprocating members 32 are disposed beneath sorter 6 and are attached along one of their edges to plate 30 by means of hinges 33 or the like. A number of parallel thrust bars 34 are secured to the upper surfaces of members 32 opposite hinges 33. Thrust bars 34 are parallel to bars 31 and correspond in number to the number of grooves 29 between bars 31. A rotating cam 35 supports at least one reciprocating member 32 and is of such configuration as to move members 32 and thrust bars 34 upwardly so that bars 34 fit into slots 36, 37 and 38 between bars 31. Bars 34 are each slanted so that the upper edges of the bars are closer to the side face of the next uppermost bar 31 than to that of the next lowermost bar 31.

Thrust bars 34 are of sufficient height so that their top surfaces are slightly above the top surfaces of bars 31 when reciprocating members 32 are in their highest position. Further motion of cam 35 lowers members 32, removing thrust bars 34 from slots 36, 37 and 38.

As the moving balls reach sorter 6, they fall into the first slot 36. As bars 34 are pushed up into the slots, the balls are thrust up and out of slot 36, and fall downwardly into slot 37. Similarly, the balls are thrust out of slot 37 and fall into slot 38. As the balls jump from slot to slot they are given a rotating motion due to the fact that each thrust bar 34 is slanted and closer at the upper end to the side face of the next uppermost bar 31 than to the next lowermost bar. If the balls have any flat surfaces, they will not be supported by bars 31 and will fall into receptacle 25 to be disposed of. Similarly, any remaining broken or undersized pieces will be eliminated.

The speed of reciprocation of members 32 and the angle of incline of the sorter 6 will effect the proper jumping of balls between slots 36, 37 and 38. The proper speed and angle can be determined by experimentation.

The number of slots may vary according to the particular needs, the three shown being merely illustrative. However, enough slots must be present so that the balls are completely rotated while passing through sorter 6. Only those balls which are perfect will remain.

The stream of perfect balls is then transferred by the last inclined thrust bar 34 to an inclined plate 39 and the balls are then collected for shipping.

Any means to drive the various moving parts of the apparatus may be used. A motor driven drive shaft with a number of belts and pulleys would be suitable.

The invention provides a novel process and apparatus for obtaining perfectly spherical balls from a mat or cluster of integrally attached molded balls in one continuous operation, all undesirable matter being disposed of.

The balls are processed in large numbers in a matter of minutes with no manual handling or inspection needed. The size of the apparatus may vary, according to the needs of the user.

Various modes of carrying out the invention are contemplated as being within the scope of the following claims particularly pointing out and distinctly claiming the subject matter which is regarded as the invention.

I claim:

1. An apparatus for processing and sorting balls formed of a material tending to hold the balls together in mat-like assembly comprising, a rotary cylindrical tumbler for breaking up mats of said balls into clusters or individual balls, means to wash the balls while said balls are being tumbled, means to dry said washed balls, a cluster breaker disposed to receive clusters and balls from said drying means and presenting a shearing surface to the ball clusters to break the clusters into individual balls and to remove protrusions or other extraneous matter from said balls, an inclined chaff removed disposed to receive the extraneous matter and balls from said cluster breaker and having spaced slats providing openings between the slats for disposing of undersized balls and extraneous matter removed by said cluster breaker, an inclined member disposed to receive the balls passing from said cluster breaker, a conveyor moving across said inclined member in a direction transverse to the direction of ball flow and having a plurality of grooves disposed in a direction parallel to the ball flow, said conveyor operating to carry off from the path of ball flow a substantial number of balls of a shape preventing passage through the grooves of the conveyor while permitting passage through the conveyor of balls of a generally round shape, a ball sorter extending in said inclined member beyond said conveyor and provided with a plurality of spaced parallel bars and reciprocating means extending transversely to the path of flow of the balls to bounce the balls between said bars and effect removal of any remaining out-of-round and under-sized balls, and means to receive the sorted balls from said ball sorter.

2. In an apparatus for processing and sorting a continuous stream of plastic balls formed in a molding operation wherein some of the balls may be integrally attached, the combination of a rotatably driven endless belt which presents a high friction face to said balls, means disposed above the top surface of said belt to apply a shearing force to the balls as the balls pass over the belt and under said means to detach any attached balls and remove extraneous amtter from the ball surfaces, means adapted to receive the balls and extraneous matter from said belt and to separate said extraneous matter from the ball stream, a grooved conveyor belt disposed to receive the balls from said last named means and moving transversely to the path of flow of the balls to carry off non-spherical balls with the grooves of the conveyor permitting spherical balls to pass longitudinally therethrough, and a ball sorter receiving the balls passing through the conveyor belt and having a plurality of fixed spaced parallel bars and a plurality of thrust bars with the latter being adapted to reciprocate within the spaces between said parallel bars to bounce the balls from space to space between said parallel bars and thereby rotate the balls so that any flat-surfaced balls will fall through the spaces and thereby be removed from the ball stream and the spherical balls will pass from the ball sorter for packaging or the like.

3. In an apparatus for processing and sorting plastic balls, a pair of rotatable spaced parallel cylinders, an endless belt having a high friction face and disposed over said members so as to rotate therewith, shearing means having a non-skid bearing surface and spaced above the top face of said belt, and means to reciprocate said shearing means in a direction transverse to the direction of movement of said belt so that ball clusters traveling on said belt will be sheared and broken into individual balls as the clusters pass between said shearing means and said belt.

4. In an apparatus for processing and sorting a stream of balls, means supporting said balls in a predetermined path of flow, a conveyor comprising a pair of rotatable spaced parallel cylindrical members disposed on either side of said means, an endless belt disposed thereover and adapted to rotate therewith in a direction transverse to the direction of ball flow over said means, and a plurality of parallel grooves disposed in the outer surface of said belt in a direction parallel to the direction of ball flow, said grooves having a cross-section sufficient to allow the passage of balls therethrough from said means, the round balls passing completely through said slots and the out-of-round balls stopping in said slots and falling from the conveyor as the out-of-round balls reach an end of the conveyor.

5. In an apparatus for processing and sorting a continuous stream of balls initially formed in mat-like assembly, means for breaking up mats of said balls into clusters or individual balls, a cluster breaker disposed to receive said clusters and balls and presenting a shearing surface to the ball clusters to break the clusters into individual balls and to remove extraneous matters from said balls, means adapted to receive the balls and extraneous matter from said cluster breaker and to separate said extraneous matter from the ball stream, means adapted to receive the balls from said last-named means and to carry off non-spherical balls transversely of the direction of the ball stream while permitting substantially spherical balls to continue in the stream, and means adapted to receive said substantially spherical balls and having a plurality of spaces provided therein, said last named means rotatably bouncing the balls between said spaces to sort the balls according to size.

References Cited in the file of this patent

UNITED STATES PATENTS

| 288,743 | Swingle | Nov. 20, 1883 |
| 1,755,721 | Winkler et al. | Apr. 22, 1930 |
| 1,865,086 | Cutler | June 28, 1932 |
| 1,970,107 | Stebler | Aug. 14, 1934 |
| 2,059,038 | Sala | Oct. 27, 1936 |
| 2,582,872 | Krengel | Jan. 15, 1952 |

FOREIGN PATENTS

| 564,162 | Germany | Nov. 14, 1932 |
| 697,896 | Great Britain | Sept. 30, 1953 |